(12) United States Patent
Huang et al.

(10) Patent No.: US 12,504,828 B2
(45) Date of Patent: Dec. 23, 2025

(54) THERMAL-IMAGE PROXIMITY GESTURE RECOGNITION MODULE, DEVICE HAVING THERMAL-IMAGE PROXIMITY GESTURE RECOGNITION FUNCTION, AND THERMAL-IMAGE PROXIMITY GESTURE RECOGNITION

(71) Applicant: GOALTOP TECHNOLOGY CORPORATION, Taoyuan (TW)

(72) Inventors: Shih-Feng Huang, Taoyuan (TW); Jhih-He Liao, Taoyuan (TW)

(73) Assignee: GOALTOP TECHNOLOGY CORPORATION, Taoyuan (TW)

( * ) Notice: Subject to any disclaimer, the term of this patent is extended or adjusted under 35 U.S.C. 154(b) by 233 days.

(21) Appl. No.: 17/960,086

(22) Filed: Oct. 4, 2022

(65) Prior Publication Data

US 2023/0146883 A1 May 11, 2023

(30) Foreign Application Priority Data

Nov. 11, 2021 (TW) .................................. 110142095

(51) Int. Cl.
| | | |
|---|---|---|
| G06F 3/01 | (2006.01) | |
| G06T 7/20 | (2017.01) | |
| G06V 40/20 | (2022.01) | |
| H04N 5/33 | (2023.01) | |
| H04N 25/75 | (2023.01) | |

(52) U.S. Cl.
CPC .............. *G06F 3/017* (2013.01); *G06F 3/011* (2013.01); *G06T 7/20* (2013.01); *G06V 40/28* (2022.01); *H04N 5/33* (2013.01); *H04N 25/75* (2023.01)

(58) Field of Classification Search
None
See application file for complete search history.

(56) References Cited

U.S. PATENT DOCUMENTS

2015/0253193 A1* 9/2015 Schilz .................... G01P 13/00
250/342
2021/0141511 A1* 5/2021 Li .......................... G06F 3/017

* cited by examiner

*Primary Examiner* — Tuan S Nguyen
(74) *Attorney, Agent, or Firm* — Muncy, Geissler, Olds & Lowe, P.C.

(57) ABSTRACT

A thermal-image proximity gesture recognition module, a device having a thermal-image proximity gesture recognition function, and a thermal-image proximity gesture recognition method are disclosed. The device has a non-lens infrared window and a thermal-image proximity gesture recognition module. In the thermal-image proximity gesture recognition module, a thermal sensor array senses infrared irradiated from an object 5~35 cm distant therefrom, and generates a thermal image array and output a thermally induced voltage array; an analog-to-digital converter converts the thermally inducted voltage array into a digital thermally inducted voltage array; a microcontroller receives the digital thermally induced voltage array of frames in a detection sequence, to determine whether there is a thermal object block matching a hand feature, and if yes, the microcontroller generates a gesture command based on a change of the thermal object block in at least two frames and transmits the gesture command to a main microcontroller.

12 Claims, 12 Drawing Sheets

THERMAL-IMAGE PROXIMITY GESTURE RECOGNITION MODULE, DEVICE HAVING THERMAL-IMAGE PROXIMITY GESTURE RECOGNITION FUNCTION, AND THERMAL-IMAGE PROXIMITY GESTURE RECOGNITION

BACKGROUND

1. Technical Field

The disclosure relates to a gesture recognition technology, and more particularly to a thermal-image proximity gesture recognition module, a device having a thermal-image proximity gesture recognition function, and a thermal-image proximity gesture recognition method which apply a thermal image technology.

2. Background

Severe special infectious pneumonia (Coronavirus disease 2019, COVID-19) epidemic is the infectious disease that has affected most countries in human history, and it changes human perception and behavior about infectious diseases. To control the epidemic of COVID-19, countries around the world have adopted various epidemic control measures, and the most common control measure is the social distancing control between people, so many technology companies have also launched a technology, proximity sensing technology, to support the epidemic prevention.

The touch technology requires a touch of a finger to perform a control action, but the touch of the finger may cause the spread of the virus, so many manufacturers have been thinking about how to use the proximity sensing technology, which is touchless, to replace certain equipment and products that may cause virus transmission, such as elevator buttons (mechanical or touch-sensitive buttons), buttons of various equipment in restaurants, ordering machines, ATM, various public rental systems (such as public bicycle rental system, public electric motorcycle rental system, shared washing machines, or shared car washes), and these public control equipment or products that may be in contact with the fingers of different people may become a breeding ground for the spread of the virus. All of these products can use the proximity sensing technology to greatly improve the effect of epidemic prevention, for example, the touch for triggering a control action can be replaced by proximity sensing, to greatly reduce the possibility of virus transmission.

In addition to replacing the touch control function of the above-mentioned equipment and products for epidemic prevention, the proximity sensing technology has also been applied to other fields, such as earphones controlled by proximity sensing gestures, or a car audio system controlled by proximity sensing gestures.

At present, the proximity sensing technologies are mainly divided into two categories including an active proximity sensing technology and a passive proximity sensing technology. The active proximity sensing technology is to emit a specific signal and then receives a reflected signal, to determine whether an object reflecting the signal is a hand, and then determines a motion of the hand to output a gesture control signal. The active proximity sensing technologies include an infrared technology that infrared is transmitted and reflected infrared is received, an ultrasonic-type technology that ultrasonic signal is transmitted and reflected ultrasonic signal is received, a radar-type technology that a radar signal is transmitted and a reflected radar signal is received, a structured-light-type technology that specific light source is transmitted and a reflected light is received through the camera; the image formed by the received signal is processed to determine presence of a hand, and then a gesture of the hand is recognized. The passive proximity sensing technology includes the capacitive electric field control technology which determines whether there is a charged object approaching based on the interfere electric field of a hand; however, the capacitive electric field control technology is less able to determine whether the charged object is a hand or other object and is impossible to determine a gesture, but it can determine the movement direction of the charged object.

Therefore, both the active and passive proximity sensing technologies need to solve the technical problem of recognizing a specific gesture. For example, the active proximity sensing technology generally applies sensors (such as ultrasonic sensors or radars) disposed in a matrix arrangement or a specific arrangement to receive the reflected signal generated from an object by reflecting an emitting signal, to detect presence of the object, confirm whether the object is a hand, and then confirm a gesture of the hand.

The active proximity sensing technology needs to emit a signal and then determine the gesture based on the reflected signal, so it has the problem of relatively more power consumption. The passive capacitive sensing technology needs to generate a large electric field to detect the interference to the electric field, so it also has a problems of high power consumption and the possibility of misjudging a non-hand object interfering the electric field as a hand. Therefore, how to develop a passive proximity sensing technology which has low power consumption and is able to easily recognize a hand and gestures has become the technical goal that various manufacturers want to develop under the current huge market demand.

SUMMARY

An objective of the disclosure is to provide a thermal-image proximity gesture recognition module, a device having a thermal-image proximity gesture recognition function, and a thermal-image proximity gesture recognition method; a thermal sensor array is disposed on a device having a non-lens infrared window; because the non-lens infrared window is not a lens, the thermal sensor array is able to sense a short-range thermal image only, such as within about 5~35 cm distance. In other words, the disclosure particularly limits a viewable distance of the thermal sensor array by the non-lens infrared window of the device, to match a distance of a proximity sensor; furthermore, the thermal sensor array is capable of sensing temperature of the hand, and when an object matching a hand temperature range is detected, the detected object is determined as a hand, the motion of the hand is then detected to determine various gestures of the hand, to achieve the passive proximity sensing technology with low power consumption, and accuracy in recognition of a hand and gestures.

In order to achieve the objective, the disclosure provides a thermal-image proximity gesture recognition module; the thermal-image proximity gesture recognition module is disposed on a device having a non-lens infrared window, and the thermal-image proximity gesture recognition module includes a thermal sensor array, an analog-to-digital converter, and a microcontroller. The thermal sensor array is formed by at least 64 thermal sensor units arranged in 8 rows and 8 columns; the at least 64 thermal sensor units are configured to sense infrared irradiated from an object which is 5~35 cm distant from the non-lens infrared window, generate a thermal image array, and output a thermally induced voltage array. The analog-to-digital converter is connected to the thermal sensor array, and configured to receive the thermal induced voltage array, and convert the thermally induced voltage array into a digital thermally inducted voltage array. The microcontroller is connected to the thermal sensor array and the analog-to-digital converter, configured to control the thermal sensor array and the analog-to-digital converter to perform thermal image sensing and signal conversion for the object, and receive the digital thermally induced voltage arrays of frames in a detection sequence to determine whether there is a thermal object block matching a hand feature, and when the thermal object block matching the hand feature is determined, the microcontroller generates a gesture command based on a change of the thermal object block in at least two of the frames, and transmits the gesture command to the main microcontroller.

In order to achieve the objective, the disclosure provides a thermal-image proximity gesture recognition method applied to use a thermal-image proximity gesture recognition module to detect a motion of an object and output a gesture command, wherein the thermal-image proximity gesture recognition module is disposed on a device having a non-lens infrared window, the thermal-image proximity gesture recognition module includes a thermal sensor array, and the thermal-image proximity gesture recognition method includes steps of: capturing a thermal image array of a frame, and obtaining a digital thermally induced voltage array corresponding to the frame; determining whether the digital thermally induced voltage array has a thermal object block matching a hand feature; when the digital thermally induced voltage array has a thermal object block matching a hand feature, generating a gesture command based on a change of the thermal object block in the frames, and transmitting the gesture command to a main microcontroller of the device.

In order to achieve the objective, the disclosure provides a device having a thermal-image proximity gesture recognition function, and the device includes an outer shell, a non-lens infrared window, a main microcontroller, and a thermal-image proximity gesture recognition module. The non-lens infrared window is disposed on the outer shell. The thermal-image proximity gesture recognition module includes a thermal sensor array, an analog-to-digital converter and a microcontroller. The thermal sensor array faces the non-lens infrared window and is formed by at least 64 thermal sensor units arranged in 8 rows and 8 columns, wherein the at least 64 thermal sensor units are configured to sense infrared irradiated from an object which is 5~35 cm distant from the non-lens infrared window, and generate a thermal image array and output a thermally induced voltage array. The analog-to-digital converter is connected to the thermal sensor array, and configured to receive the thermally induced voltage array and convert the thermally inducted voltage array into a digital thermally inducted voltage array. The microcontroller is connected to the thermal sensor array and the analog-to-digital converter, and configured to control the thermal sensor array and the analog-to-digital converter to perform thermal image sensing and signal conversion for the object, receive the digital thermally induced voltage arrays of frames in a detection sequence, and determine whether there is a thermal object block matching a hand feature presents, wherein when the thermal object block matching the hand feature is determined, the microcontroller generates a gesture command based on a change of the thermal object block in at least two of the frames and transmits the gesture command to the main microcontroller.

BRIEF DESCRIPTION OF THE DRAWINGS

The structure, operating principle and effects of the disclosure will be described in detail by way of various embodiments which are illustrated in the accompanying drawings.

DETAILED DESCRIPTION

Figure 1A:
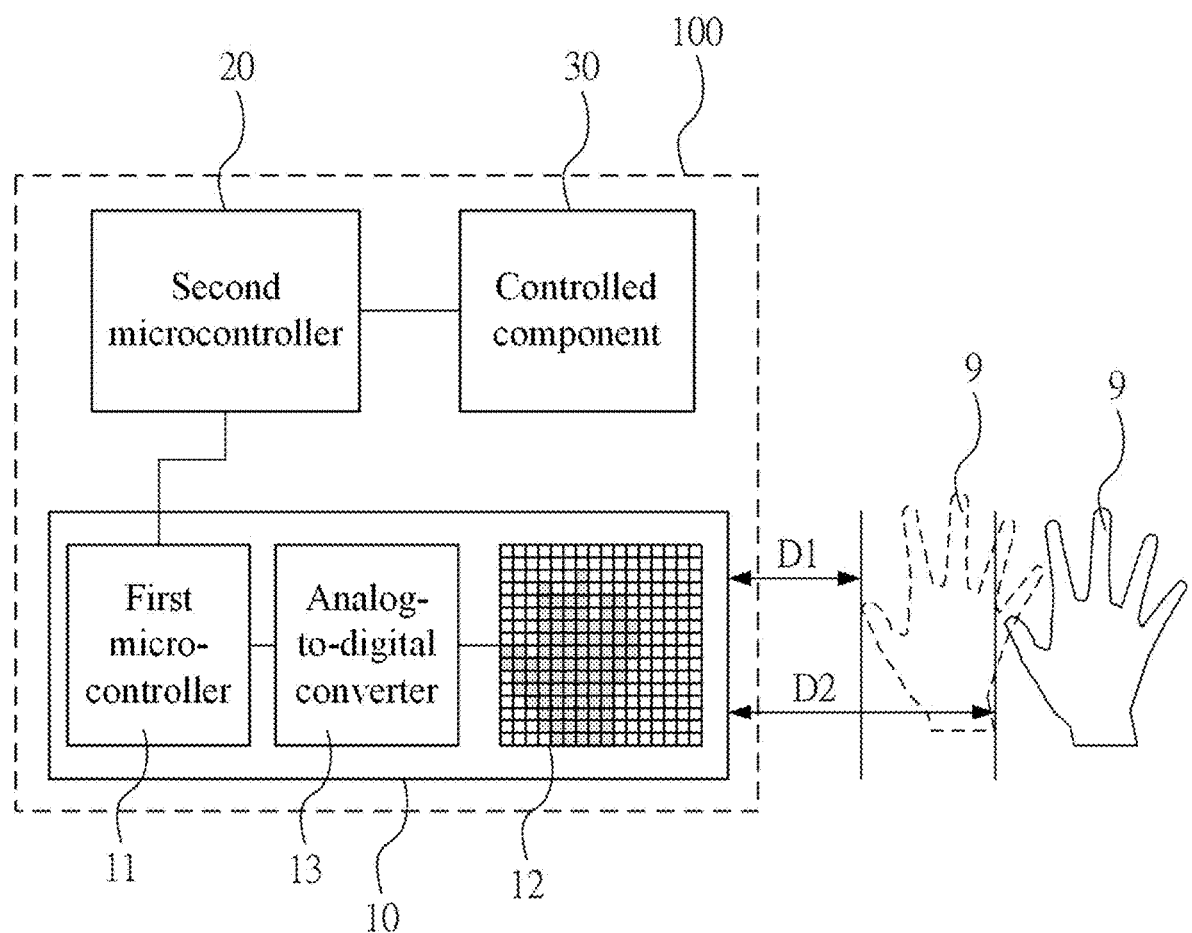
FIGS. 1A and 1B are functional block diagrams of a thermal-image proximity gesture recognition module and a device having a thermal-image proximity gesture recognition function, respectively, according to the disclosure.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

In the thermal-image proximity gesture recognition module, the device having a thermal-image proximity gesture recognition function, and the thermal-image proximity gesture recognition method of the disclosure, a thermal sensor array is disposed on a device having a non-lens infrared window, and the non-lens infrared window is not a lens, so the thermal sensor array is able to sense a short-range thermal image only, such as a thermal image within a distance of about 5~35 cm (for example, the distance D1 is 5 cm and the distance D2 is 35 cm shown in FIG. 1A). In other words, the disclosure particularly limits the viewable distance of the thermal sensor through the non-lens infrared window to match the distance of the proximity sensor, so that the thermal sensor array is capable of sensing a temperature of the hand; when a hand matching a hand temperature range is detected, the detected object is determined as a hand; next, various gestures of the hand is determined by detecting a motion of the hand, to achieve the passive proximity sensing technology with low power consumption, and accuracy in recognition of a hand and gestures.

In the disclosure, the thermal sensor array is an array formed by various thermal sensors, such as uncooled focal plane IR detector (micro bolometer) or thermopile sensing array, or other type of thermal sensor array. In an embodiment, the thermal sensor units in the thermal sensor array can be arranged as at least 8×8 array, such as 8×8 array, 10×10 array, 12×12 array, 14×14 array, 16×16 array, 18×18 array, 12×16 array, 16×24 array, 24×24 array, 16×32 array, 24×32 array or 32×32 array. When the thermal sensor units in the thermal sensor array is more, the required processing power of the microprocessor is higher; the array having higher number of thermal sensor units is able to more easily identify an outline of hand and is less likely to produce errors in hand determination (for example, an object not a hand is determined as a hand), but also requires larger processing power and causes a higher cost. The uncooled focal plane IR detector (micro Bolometer) has higher response speed (such as, 100 frame/sec) and a smaller chip area, so a lower-level microcontroller is required for subsequent thermal image processing; thermopile sensing array has a lower response speed (such as, 10 frame/sec) and a larger chip area, so a higher-level microcontroller is required for the subsequent thermal image processing.

Figure 1B:
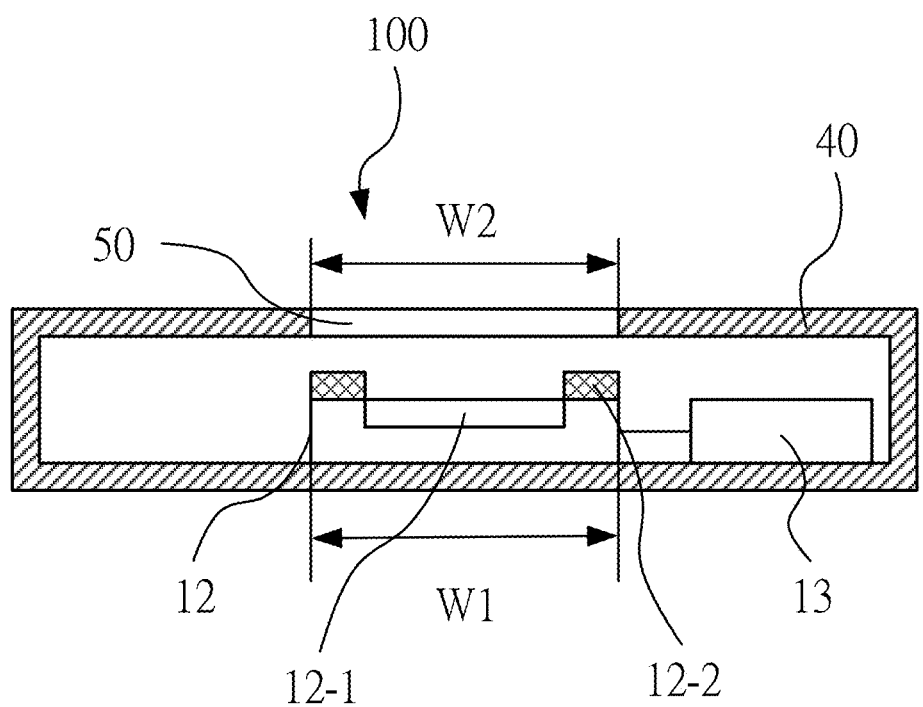

Please refer to FIGS. 1A and 1B, which are functional block diagrams of an and a device having a thermal-image proximity gesture recognition function, according to the disclosure. The device 100 having a thermal-image proximity gesture recognition function includes an outer shell 40, a non-lens infrared window 50, a second microcontroller 20, a thermal-image proximity gesture recognition module 10, and a controlled component 30.

The second microcontroller 20 (or called a main microcontroller) is configured to receive a gesture command transmitted from the thermal-image proximity gesture recognition module 10, and then control the controlled component 30 based on the gesture command. For example, the device 100 having a thermal-image proximity gesture recognition function can be a wireless headset, the controlled component 30 can be a speaker or a memory, and the gesture command can be a holding gesture command, a quick wave gesture command, a move left gesture command, a move right gesture command, a move up gesture command, a move down gesture command, a clockwise rotation gesture command, a counter-clockwise rotation gesture command, an approaching gesture command, a leaving gesture command, or an combination thereof; the control commands of the wireless headset corresponding to the gesture commands can include commands of previous song, next song, fast forward, rewind, volume up, volume down. In other words, a user within a distance about 5~35 cm from the non-lens infrared window 50 of the device 100 having a thermal-image proximity gesture recognition function is able to control various operations of the wireless headset for listening music by using hand to trigger the controlled component 30 to execute various operations.

For example, the device 100 having a thermal-image proximity gesture recognition function is an automatic teller machine, a user within a distance about 5~35 cm from the non-lens infrared window 50 of the device 100 having a thermal-image proximity gesture recognition function is able to control a screen of the automatic teller machine, the thermal-image proximity gesture recognition module 10 is equivalent to a gesture mouse of the automatic teller machine, and the user does not need to touch the screen, so the risk of virus infection is effectively reduced. In other application apparatus or products, such as elevator buttons (mechanical or touch-sensitive buttons), buttons of various equipment in restaurants, food ordering machines, various public rental systems, public bicycle rental system, public electric motorcycle rental system, shared washing machines, or shared car washes, the using modes are the same, and the difference is just that the number of the gesture commands required by different apparatuses or products are different; developers can choose the appropriate gesture commands to do development upon demand. The thermal-image proximity gesture recognition module 10 of the disclosure is able to effectively meet the requirement in the gesture command control for different apparatus and product applications.

The non-lens infrared window 50 is disposed on the outer shell 40, and made by a silicon glass or a germanium glass or other materials that allow the infrared to transmit therethrough. The non-lens infrared window 50 is configured to make the heat radiation (infrared), generated by temperature of the object 9, transmit to the thermal sensor array 12 of the thermal-image proximity gesture recognition module 10. The non-lens infrared window 50 does not need to be transparent, but needs to make infrared transmit therethrough, so it can be made by materials such as silicon glass or germanium glass, or other materials that can be highly transparent to infrared. In addition, the objective of the disclosure is to recognize the heat radiation (infrared) of the object 9 within a short distance, so the non-lens infrared window 50 is in a non-lens structure, that is, the non-lens infrared window 50 is in a plane shape or a curve shape, and does not need to focus infrared.

The non-lens infrared window 50 used in the disclosure is a non-lens architecture, the thermal-image proximity gesture recognition module 10 directly faces the non-lens infrared window 50, the ambient light source is too far for the thermal-image proximity gesture recognition module 10, and there is no lens to focus, so the ambient light source becomes a diffuse light source, the thermal-image proximity gesture recognition module 10 detects the object within about 5~35 cm of distance only therefrom. The distance of 5~35 cm is just enough for a heat source of a hand to form a thermal sensing value, which is different from the ambient light source, on the thermal sensor array 12; that is, the thermal difference value is defined as a difference between the thermal sensing value of a certain pixel in thermal sensor array 12 and an environmental background parameter (that is, an environmental background thermal sensing value) caused by the ambient light source. The above-mentioned sensing distance may be adjusted upon different sensor manufacturing process, for example, the thermal sensor array 12 formed by uncooled focal plane IR detector (micro bolometer) may sense a motion of a hand to obtain an obvious thermal image difference value within a distance of 5~15 cm, 5~20 cm, 5~25 cm, 5~30 cm, 5~35 cm, 10~20 cm, 10~25 cm, 10~25 cm, 10~30 cm, or 10~35 cm upon different manufacturing processes; furthermore, the thermal sensor array 12 is able to sense a temperature of the hand when being calibrated with reference to a standard thermometer at the factory. Generally speaking, the thermal-image proximity gesture recognition module 10 is not easy to sense an infrared signal of an object with a distance of more than 35 cm.

In FIG. 1A, the thermal-image proximity gesture recognition module 10 includes a thermal sensor array 12, an analog-to-digital converter 13, and a first microcontroller 11. The thermal sensor array 12 faces the non-lens infrared window 50, and formed by at least 64 thermal sensor units arranged in 8 rows and 8 columns. The thermal sensor units are able to sense infrared irritated from an object within a distance 5~30 cm from the non-lens infrared window 50, to generate a thermal image array and output a thermally induced voltage array. The analog-to-digital converter 13 is connected to the thermal sensor array 12, and configured to receive the thermally induced voltage array, convert the thermally inducted voltage array into a digital thermally inducted voltage array. The first microcontroller 11 is connected to the thermal sensor array 12 and the analog-to-digital converter 13, and configured to control the thermal sensor array 12 and the analog-to-digital converter 13 to perform thermal image sensing and signal conversion for the object 9, receive the digital thermally induced voltage arrays of frames in a detection sequence, and determine whether there is a thermal object block matching a thermal difference threshold; when the thermal object block matching a thermal difference threshold is determined and a size of the thermal object block is greater than a pixel quantity threshold, the first microcontroller 11 generates a gesture command based on a change in motion of the thermal object block in at least two frames, and transmits the gesture command to the second microcontroller 20. The above-mentioned operation of determining a hand is abbreviated as a thermal difference determination method; another operation of determining a hand is a temperature determination method, the first microcontroller 11 is connected to the thermal sensor array 12 and the analog-to-digital converter 13, and configured to control the thermal sensor array 12 and the analog-to-digital converter 13 to perform the thermal image sensing and signal conversion for the object 9, receive the digital thermally induced voltage arrays of frames in a detection sequence, and then determine whether there is a thermal object block matching a hand temperature range presents; when the presence of the thermal object block matching the hand temperature range is determined, the first microcontroller 11 generates the gesture command based on a change of the thermal object block in at least two frames and transmit the gesture command to the second microcontroller 20. The main difference between the thermal difference determination method and the temperature determination method is that the thermal difference determination method does not need to check the environmental temperature and the temperature of the detected object, and determines the detected object as a hand based on whether the temperature difference between the detected object and the environment matches the thermal difference threshold and the detected object matches pixel quantity threshold; these two conditions being satisfied should occurs only when the object similar to a hand is close enough to the non-lens infrared window 50. The temperature determination method is to determine a hand based on a possible range of hand temperature such as 25~35° C.; when the temperature of the detected object falls into this hand temperature range, the object is determined as a hand.

The above-mentioned thermal difference determination method and the temperature determination method are used to determine whether hand feature defined in the disclosure is matched, that is, in the temperature determination method, the thermal object block is determined to match the hand feature when the thermal object block matches a hand temperature range; in the thermal difference determination method, the thermal object block is determined to match the hand feature when the presence of the thermal object block matching a thermal difference threshold is determined and a size of the thermal object block is greater than a pixel quantity threshold.

In another embodiment of the disclosure, each of the first microcontroller 11 and the second microcontroller 20 can be implemented by single microcontroller (or called a processor).

Furthermore, in another embodiment of the disclosure, the thermal sensor array 12, the analog-to-digital converter 13, the first microcontroller 11 can be integrated to single chip; or the thermal sensor array 12, the analog-to-digital converter 13 are integrated on single chip; or the analog-to-digital converter 13, the first microcontroller 11 are integrated on single chip.

After a system is activated and when the first microcontroller 11 detects a start gesture generated correspondingly to the object 9 matching the hand temperature range, the first microcontroller 11 starts to perform a gesture recognition to output a gesture command. The start gesture can be a holding gesture, a quick wave gesture, a move left gesture, a move right gesture, a move up gesture, a move down gesture, or a rotation gesture. The above-mentioned holding gesture can be defined that the object 9 (that is, the hand) is still within the range of 5~35 cm (that is, within the detectable range of the thermal sensor array 12) for 1-3 seconds and then leaves the range. When the first microcontroller 11 uses the holding gesture as the start gesture, the first microcontroller 11 determines that the object 9 is executing the start gesture by detecting the temperature of the object 9 for the first time and then confirming that the object 9 is still within 1-3 seconds. In this embodiment, the first microcontroller 11 determines the gesture of the object 9 based on definition data of the start gesture stored in the memory thereof. The memory is usually built in the first microcontroller 11.

As shown in FIG. 1B, a size of the range where the thermal sensors are disposed in the thermal sensor array 12 is W1, and a size of the non-lens infrared window 50 is W2, and W2 is at least equal to W1 or W2 can be greater than W1. In many applications, the non-lens infrared window 50 is embedded in the outer shell 40 and usually requires waterproof and dustproof design. Furthermore, in addition to the thermal sensing area 12-1, the thermal sensor array 12 can be configured with a blocking part 12-2 which is disposed on the periphery above a top surface thereof and configured to surround the thermal sensing area 12-1 to reduce thermal interfere (internal interfere) of other elements around the thermal sensor array 12. This blocking part 12-2 can be made in the form of a ring or a square barrier wall, and the material of the blocking part 12-2 can be plastic, metal or photoresist. The blocking part 12-2 can be made of black material to reduce the interference of thermal radiation thereof.

Figure 2A:
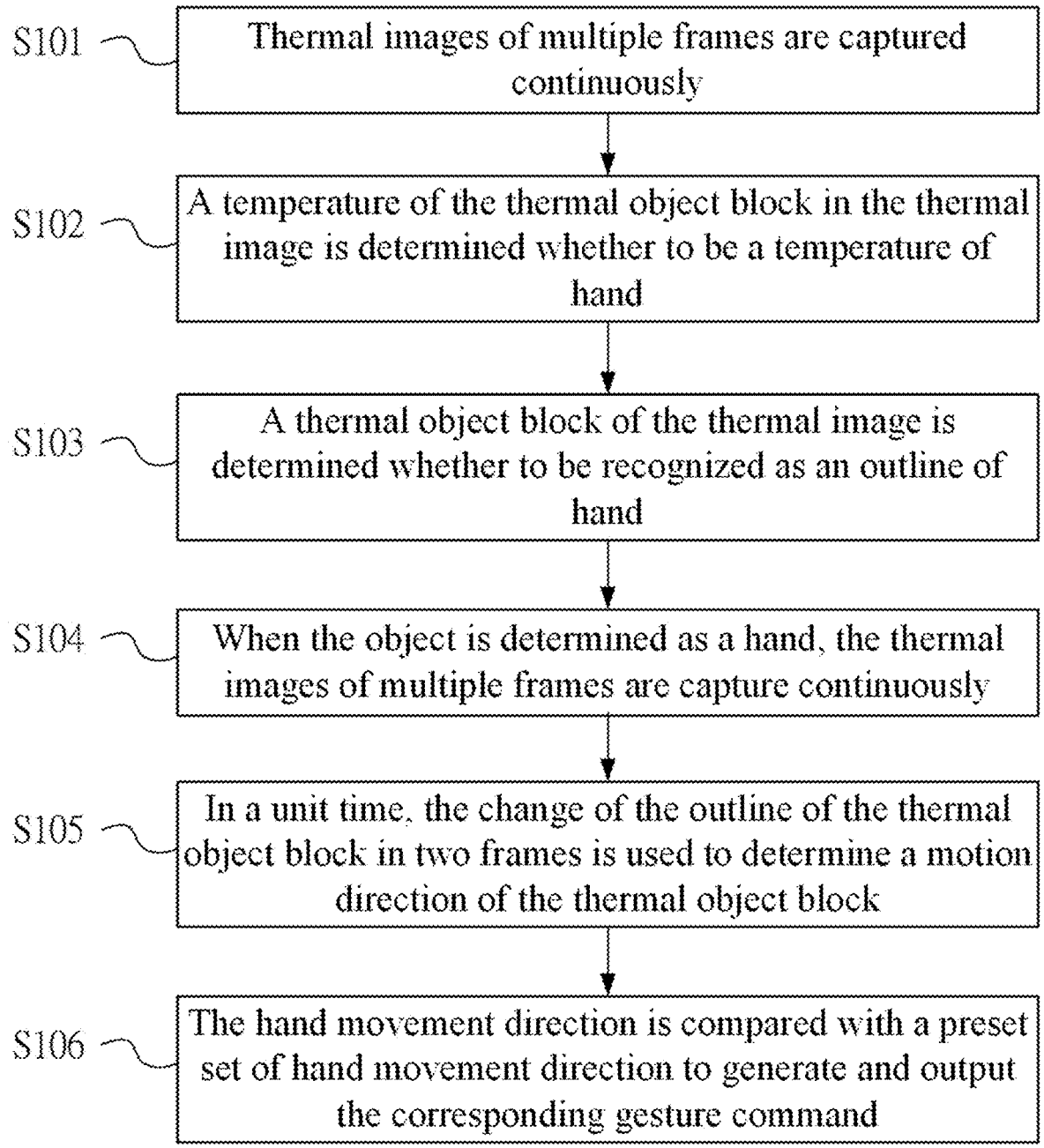
FIGS. 2A and 2B are flowcharts of two embodiments of a thermal-image proximity gesture recognition method, according to the disclosure, respectively.
Figure 2B:
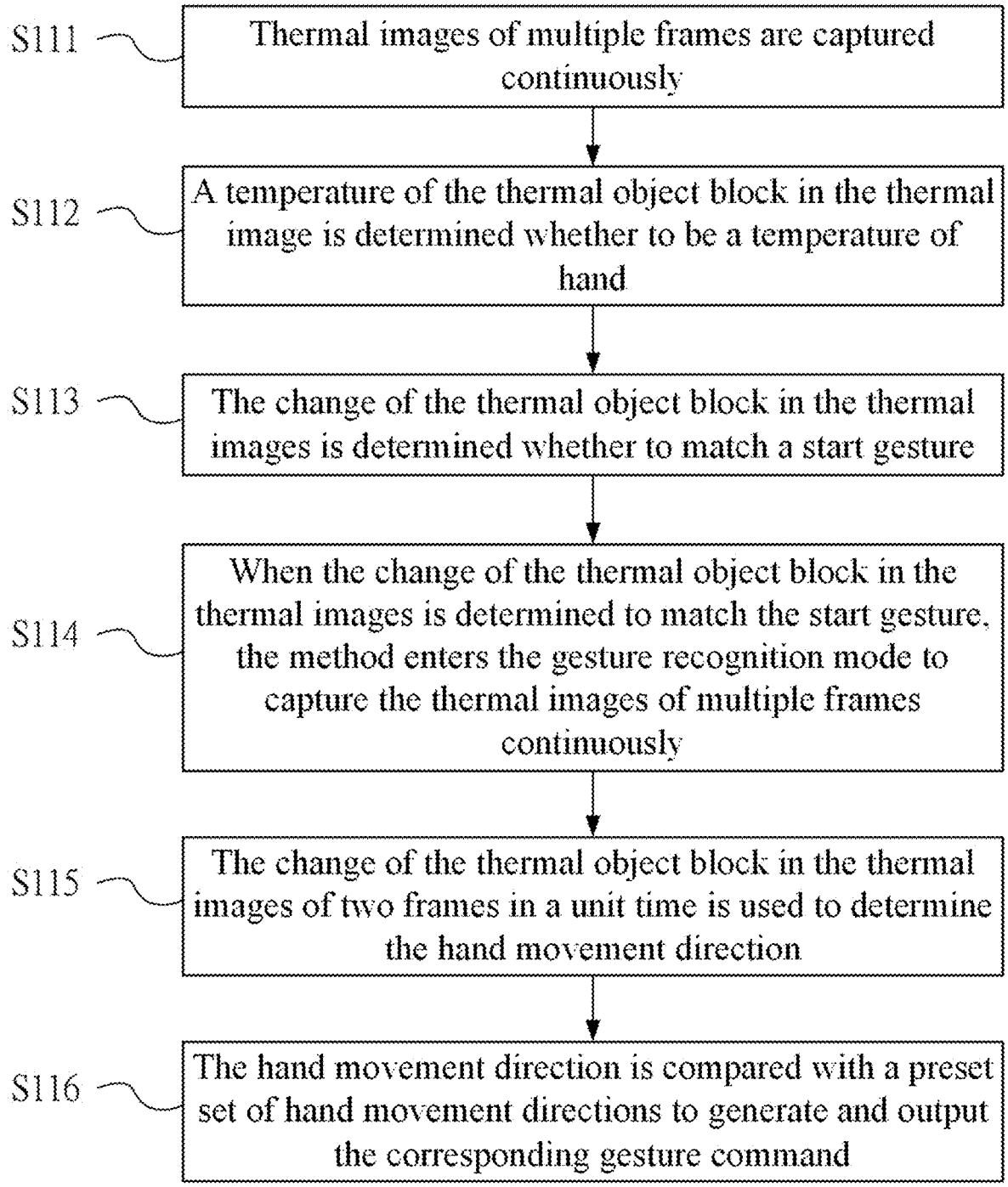
Figure 2C:
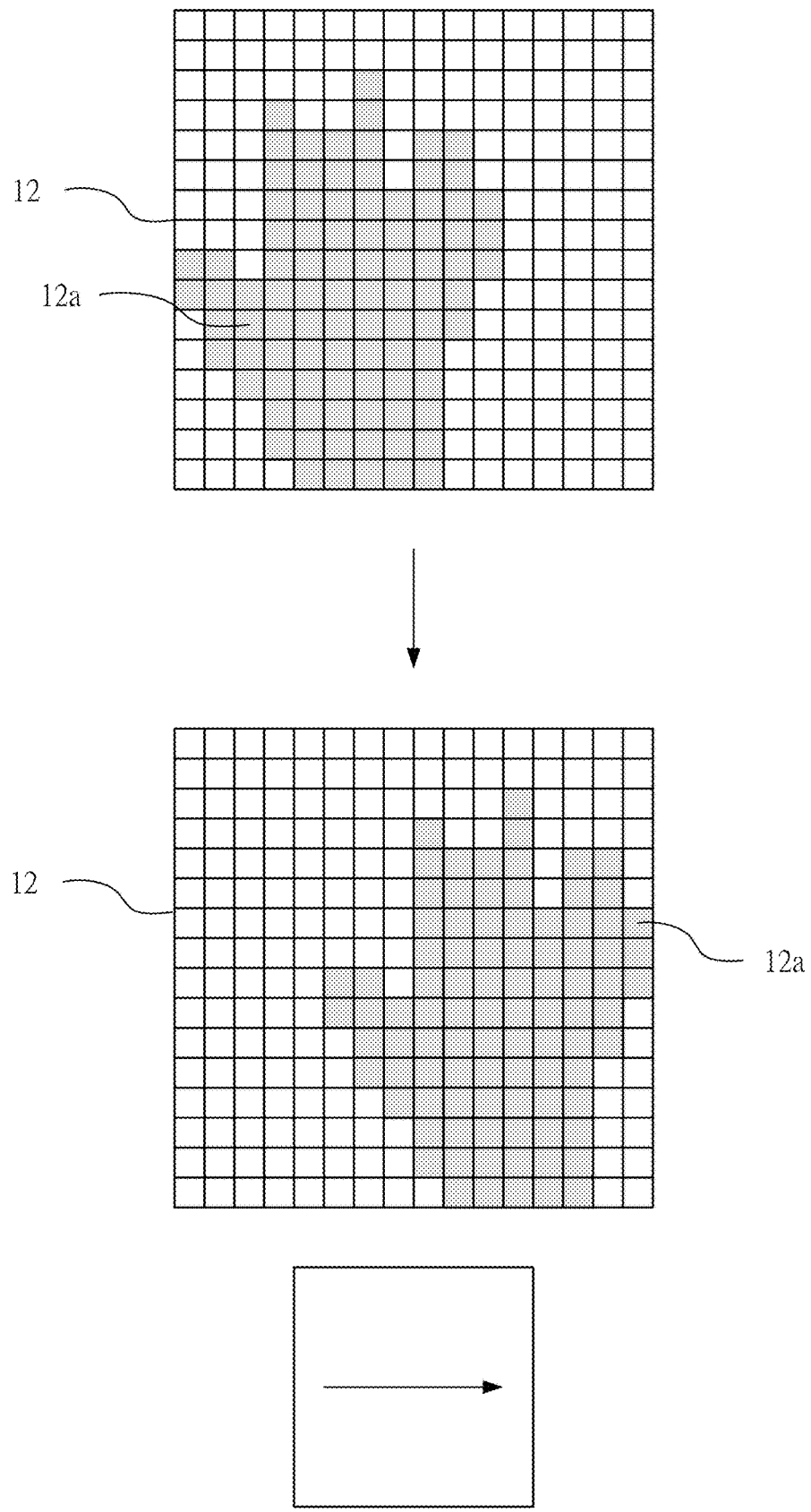
FIGS. 2C to 2H are schematic diagrams of the embodiments of a motion of the object detected by a thermal sensor array, according to a thermal-image proximity gesture recognition method of the disclosure.
Figure 2D:
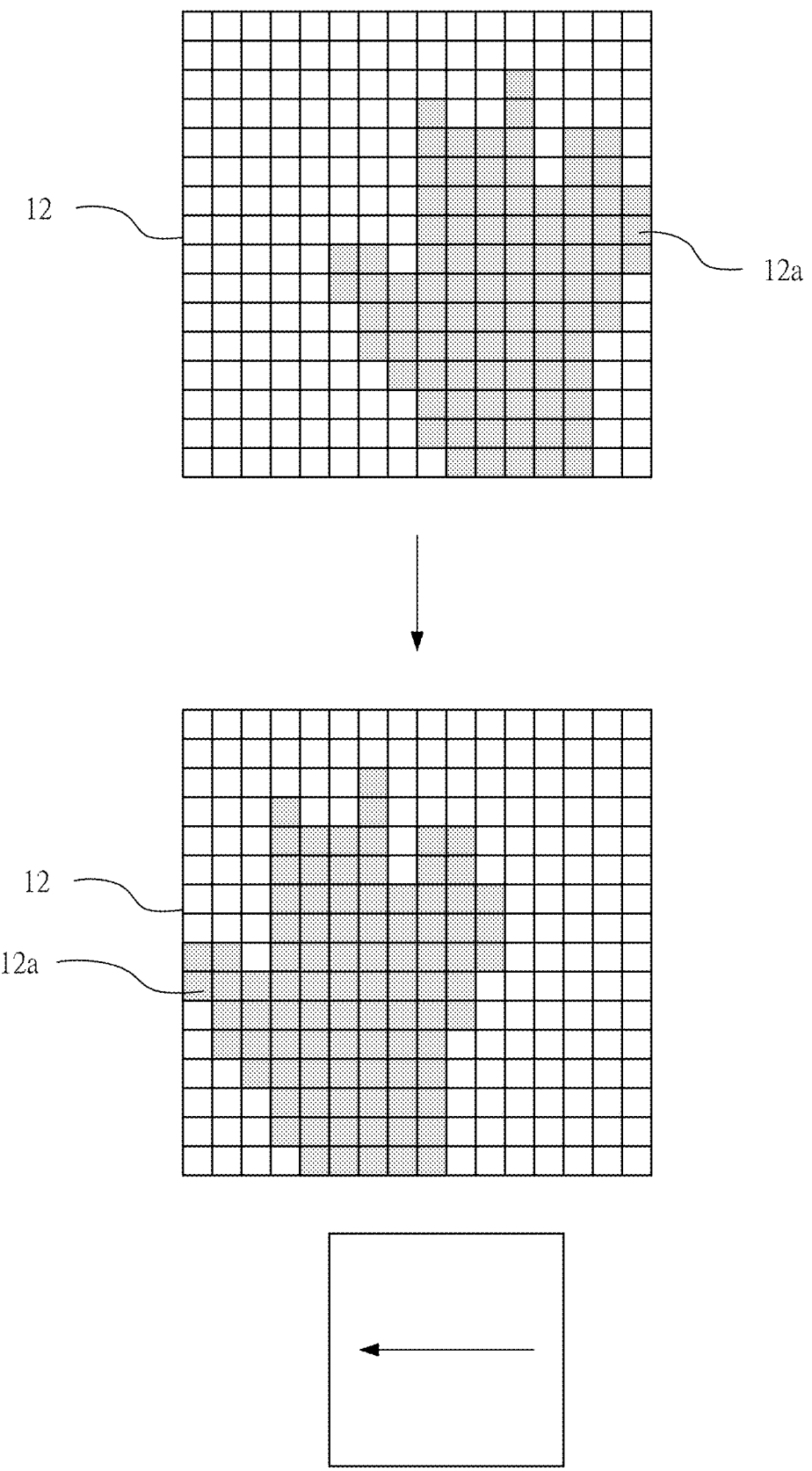
Figure 2E:
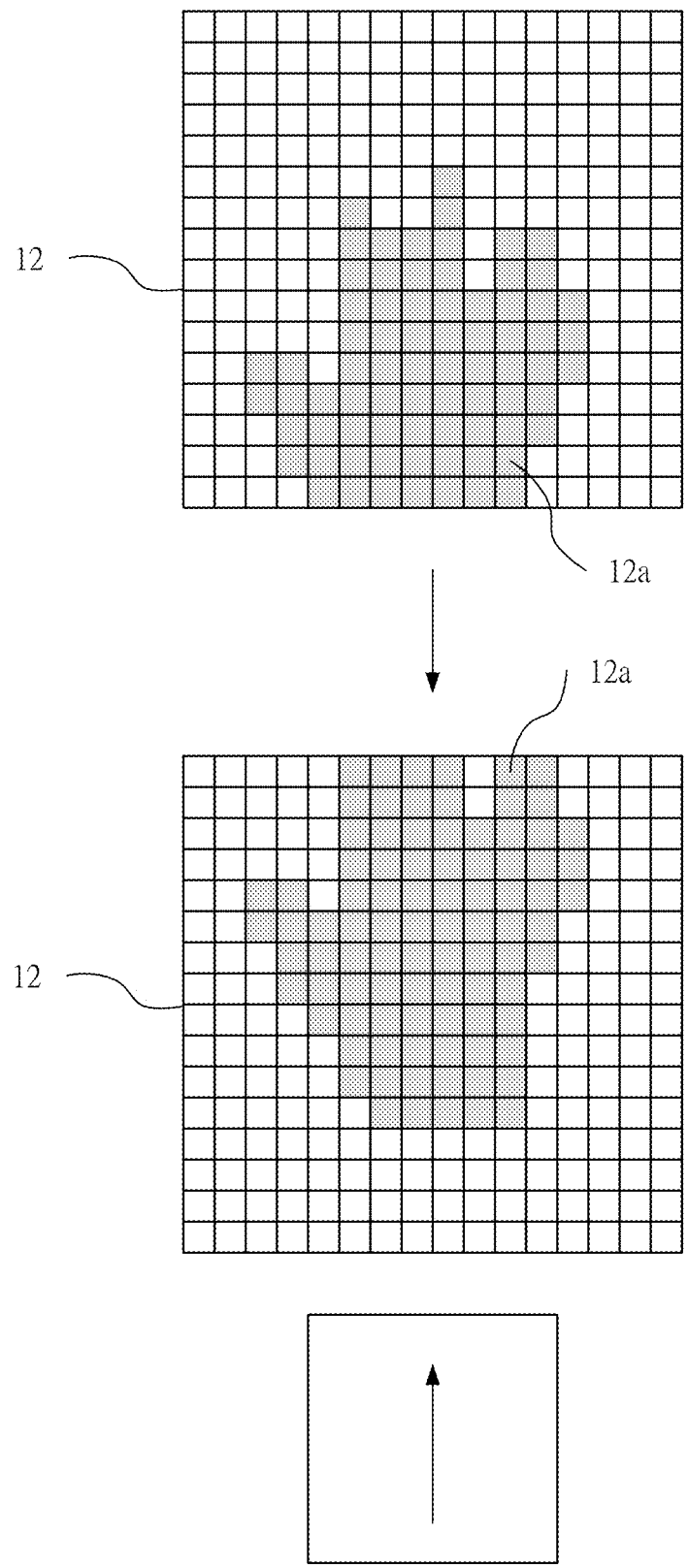
Figure 2F:
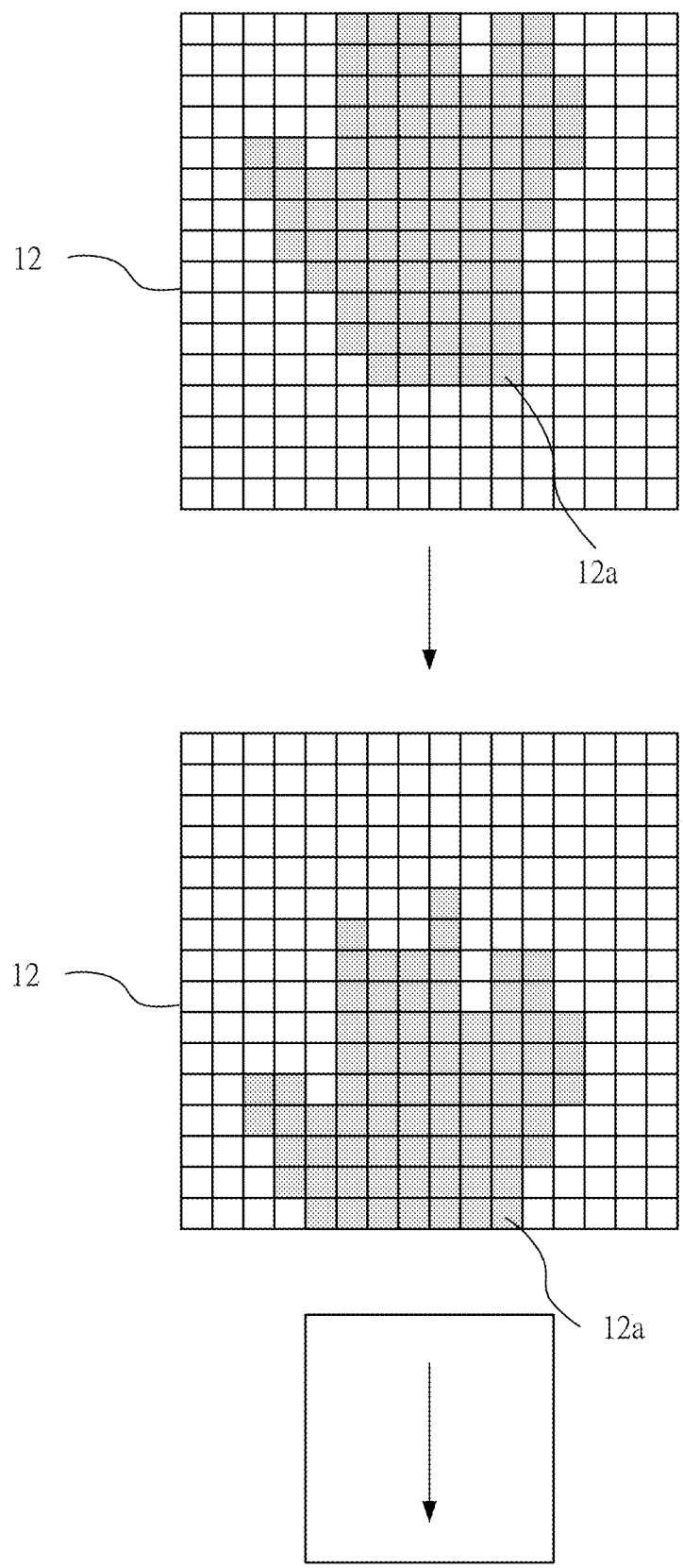
Figure 2G:
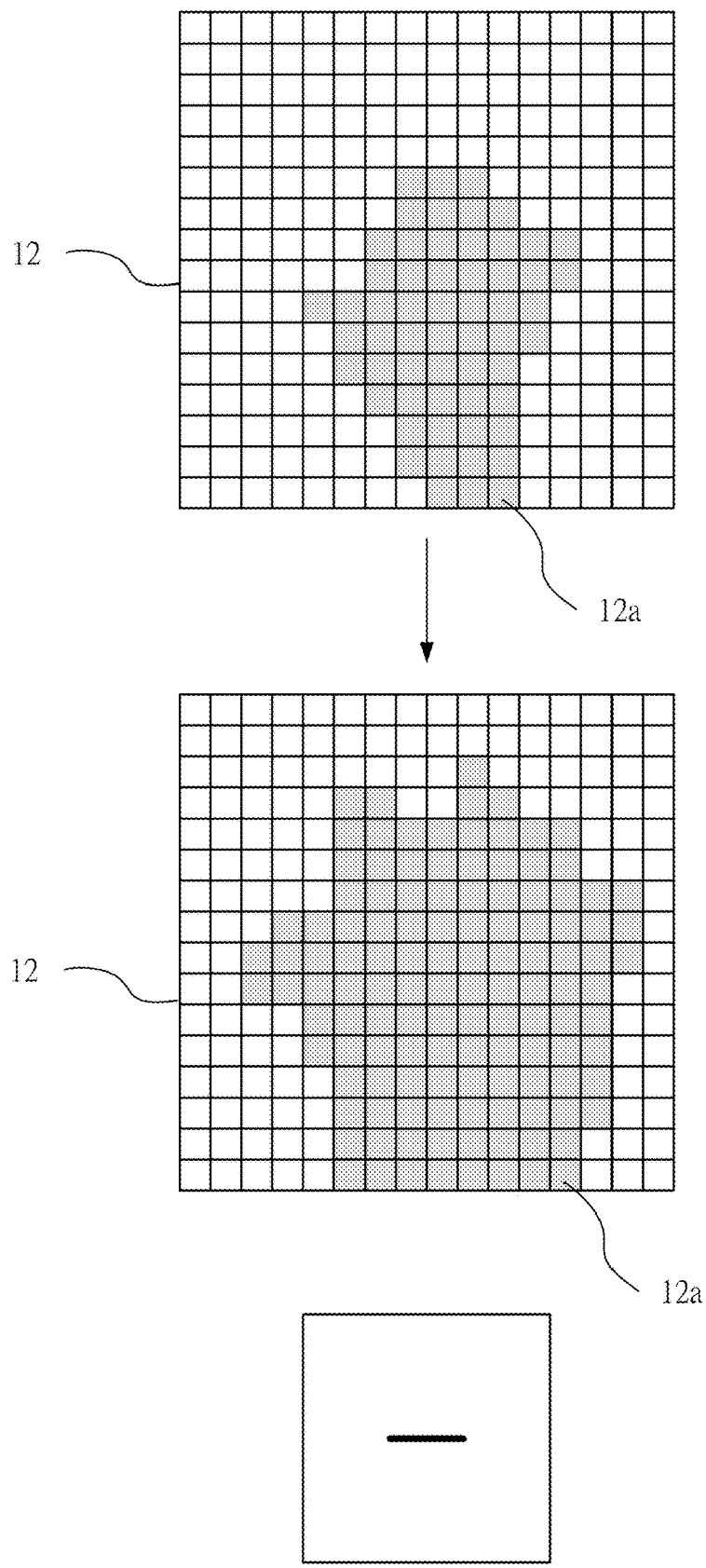
Figure 2H:
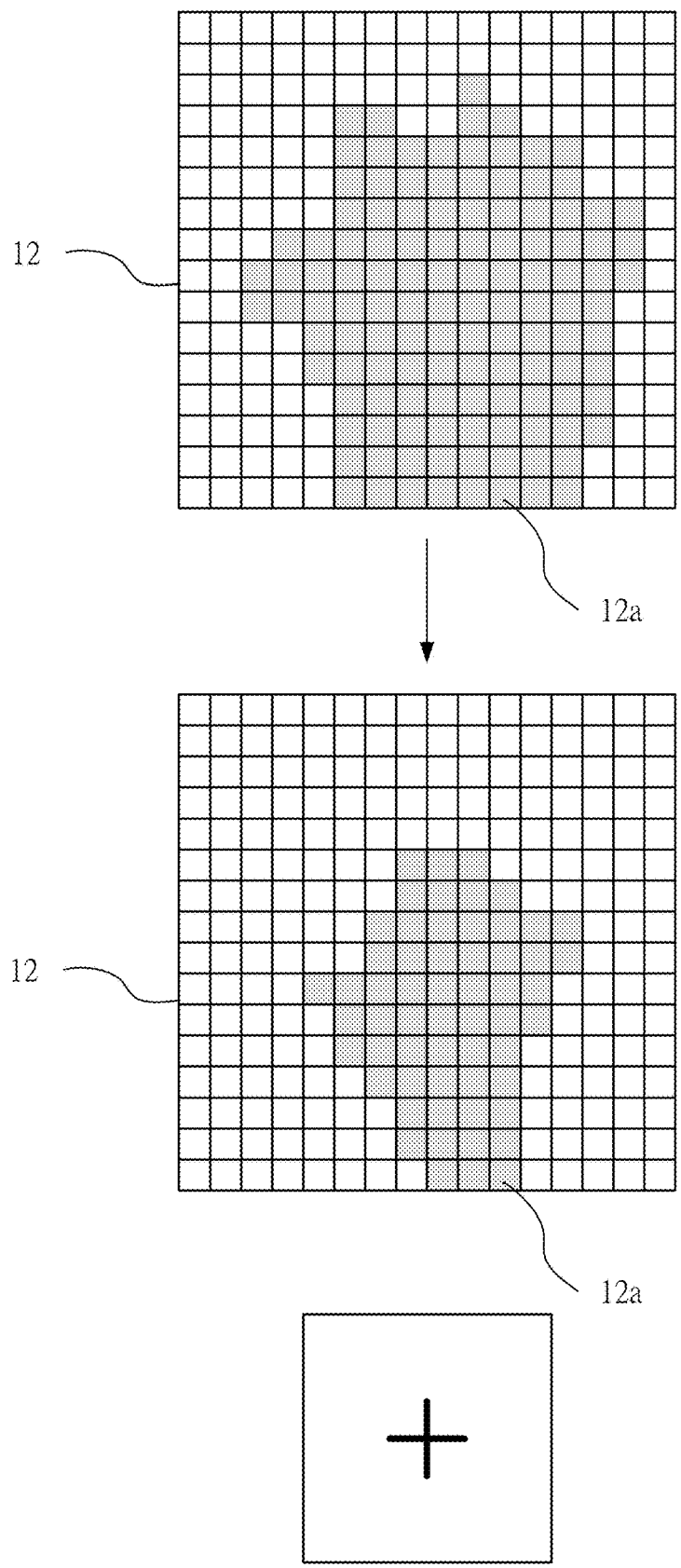

Please refer to FIGS. 2A and 2H. FIGS. 2A and 2B are flowcharts of two embodiments of the temperature determination method, according to the disclosure, FIGS. 2C to 2H are schematic diagrams of changes of the thermal image block of the object 9 detected on the thermal sensor array 12, and the thermal-image proximity gesture recognition module 10 of FIGS. 1A and 1B is applied to detect the motion of the object 9 and output the gesture command.

The embodiment of FIG. 2A includes the following steps.

In a step S101, thermal images of multiple frames are captured continuously. After being activated, the thermal-image proximity gesture recognition module 10 starts to capture the thermal image; that is, the first microcontroller 11 controls the operations of the thermal sensor array 12 and the analog-to-digital converter 13 to capture a thermal image of the thermal sensor array 12 in a unit of frame every cycle.

In a step S102, a temperature of the thermal object block in the thermal image is determined whether to be a temperature of hand. This step is to determine whether the thermal object block 12a of the thermal image (as shown in FIGS. 2C to 2H) matches a temperature range of a hand, such as a range of 25.0° C. to 35° C. In the embodiment, a temperature calibration can be performed on the thermal sensor array 12 before delivery, to enable the thermal sensor array 12 to detect a temperature with higher accuracy.

In a step S103, the thermal object block of the thermal image is determined whether to be recognized as an outline of hand. The first microcontroller 11 can store a built-in fuzzy recognition algorithm to recognize whether the outline of the thermal object block 12a is an outline of hand. In the disclosure, the device 100 having the thermal-image proximity gesture recognition function is designed with the non-lens infrared window 50, so the thermal sensor array 12 of the thermal-image proximity gesture recognition module 10 is able to sense the heat radiation (infrared) irradiated from the object 9 within a distance of 5 to 35 cm. Therefore, in addition to the operation of using the hand temperature as determination basis, the method of recognizing a hand can apply the auxiliary determination mentioned in the step S103 to confirm that the object 9 is a hand. Particularly, the thermal images of various patterns of a hand are captured and stored in advance, and feature values of the thermal images of the hand are calculated through machine learning, so that the hand feature values are applied to determine whether the thermal image of the next object 9 is a hand.

In a step S104, when the object is determined as a hand, the thermal images of multiple frames are capture continuously. After the object 9 is determined as a hand through step S102 and step S103 (for example, based on the temperature and the outline of the thermal image, the method proceeds the gesture recognition process, that is, the steps S104 to S106.

In a step S105, in a unit time, the change of the outline of the thermal object block in two frames is used to determine a motion direction of the thermal object block. For example, in a unit time (such as one second or two seconds), a motion mode of the object 9 is defined based on the number of the thermal image arrays captured by the thermal sensor array 12, for example, the number of the thermal image arrays is the number of the frames captured by the uncooled focal plane IR detector (micro bolometer) which captures 100 frames per second, or by thermopile sensing array which captures 10 frames per second.

For example, as shown in FIG. 2C, when the thermal object block 12a moves from a left side to a right side in a unit time, it defines that the thermal object block 12a moves from left to right. The first microcontroller 11 receives the movement of a coordinate group of the thermal object block 12a matching the hand temperature, that is, in unit time, as long as the moving mode of the thermal object block 12a matching the hand temperature matches the movement of the coordinate group, the first microcontroller 11 can determine that the object 9 moves from left to right.

For example, as shown in FIG. 2D, when the thermal object block 12a moves from a right side to a left side in a unit time, it defines that the thermal object block 12a moves from right to left.

For example, as shown in FIG. 2E, the thermal object block 12a moves from a lower side to an upper side in a unit time, it defines that the thermal object block 12a moves from down to up.

For example, as shown in FIG. 2F, the thermal object block 12a moves from an upper side to a lower side in a unit time, it defines that the thermal object block 12a moves from up to down.

For example, as shown in FIG. 2G, the thermal object block 12a moves from a far side to a near side in a unit time, it defines that the thermal object block 12a moves from far to near, that is, the hand is approaching.

For example, as shown in FIG. 2H, the thermal object block 12a moves from a near side to a far side in a unit time, it defines that the thermal object block 12a moves from near to far, that is, the hand is leaving.

In a step S106, the hand movement direction is compared with a preset set of hand movement direction to generate and output the corresponding gesture command. In addition to the embodiments of FIGS. 2C to 2H, there are another movement determination results, such as clockwise rotation or counter-clockwise rotation. In the disclosure, a finger recognition is not performed on the thermal image, and only hand determination is performed on the thermal image. As long as the thermal object block matches one of recorded features of hand, the first microcontroller 11 determines the thermal object block as a hand and then determines the movement direction of the hand according to the motion mode of FIGS. 2C to 2H. Next, the first microcontroller 11 outputs the gesture command based on the movement direction and the predefined gesture commands corresponding to the predefined movement directions. As described above, the gesture commands for wireless headsets, the gesture commands for food ordering machines, the gesture commands for ATMs, and the gesture commands for public rental systems can be different from each other upon the definition of the product ends.

Please refer to FIG. 2B, which is a flowchart of another embodiment of a thermal-image proximity gesture recognition method, according to the disclosure. The embodiment includes the following steps.

In a step S111, the thermal images of multiple frames are capture continuously, similar to the step S101.

In a step S112, the temperature of the thermal object block in the thermal image is determined whether to be a temperature of hand, similar to the step S102.

In a step S113, the change of the thermal object block in the thermal images is determined whether to match a start gesture. As described above, the start gesture corresponds an activation direction and can be a holding gesture, a quick wave gesture, a move left gesture, a move right gesture, a move up gesture, a move down gesture, or a rotation gesture. In this step, the first microcontroller 11 determines whether the thermal object block 12a executes the start gesture based on the gesture recognition process of the steps S104 to S106. The start gesture can be the same as the various sequential gestures; the key point is that, after the system is activated, the first microcontroller 11 can suppose that the object 9 is a hand as long as the sensed temperature matches the hand temperature mentioned in the step S112. The start gesture is specified in the specification of the device 100 having the thermal-image proximity gesture recognition function, so that a user can operate and confirm the system after the user is familiar with the start gesture. For example, the quick wave gesture is defined as wave back and forth at least twice in a unit time (such as 1 second or 2 seconds); such actions are preset in the system, and the system can interpret the preset action, so the system determines that this gesture action is indeed a deliberate action by the user and then enters the sequential gesture recognition process when the system captures these preset gesture actions.

In other words, the effect of the start gesture is to allow the user uses the preset action to confirm the intention for controlling device by gesture, thereby preventing misuse of gesture.

In another embodiment of the disclosure, the start gesture can also be set by the user. That is, the user can customize the start gesture through a specific setting process.

In another embodiment of the disclosure, a stop gesture can be set for the system. After the stop gesture is executed from the step S114 to the step S116, the recognition and output of the control gesture are stopped until the start gesture is recognized to activate the system again. The stop gesture should be different from the subsequent control gestures and the start gesture.

In a step S114, when the change of the thermal object block in the thermal images is determined to match the start gesture, the method enters the gesture recognition mode to capture the thermal images of multiple frames continuously.

In a step S115, the change of the thermal object block in the thermal images of two frames in a unit time is used to determine the hand movement direction.

In a step S116, the hand movement direction is compared with a preset set of hand movement directions to generate and output the corresponding gesture command.

The process from the step S114 to the step S116 is substantially the same as that from step S104 to step S106, and the difference between two embodiments is that the embodiment of FIG. 2A adopts the hand outline determination but the embodiment of FIG. 2B adopts the start gesture recognition; the two embodiments has different advantages. Furthermore, another embodiment of the disclosure can be implemented by integrating the two embodiments, that is, the another embodiment can adopt both of the hand outline determination and the start gesture recognition, and then enter the control-gesture recognition (the steps S104 to S106, or the steps S114 to S116).

Figure 3A:
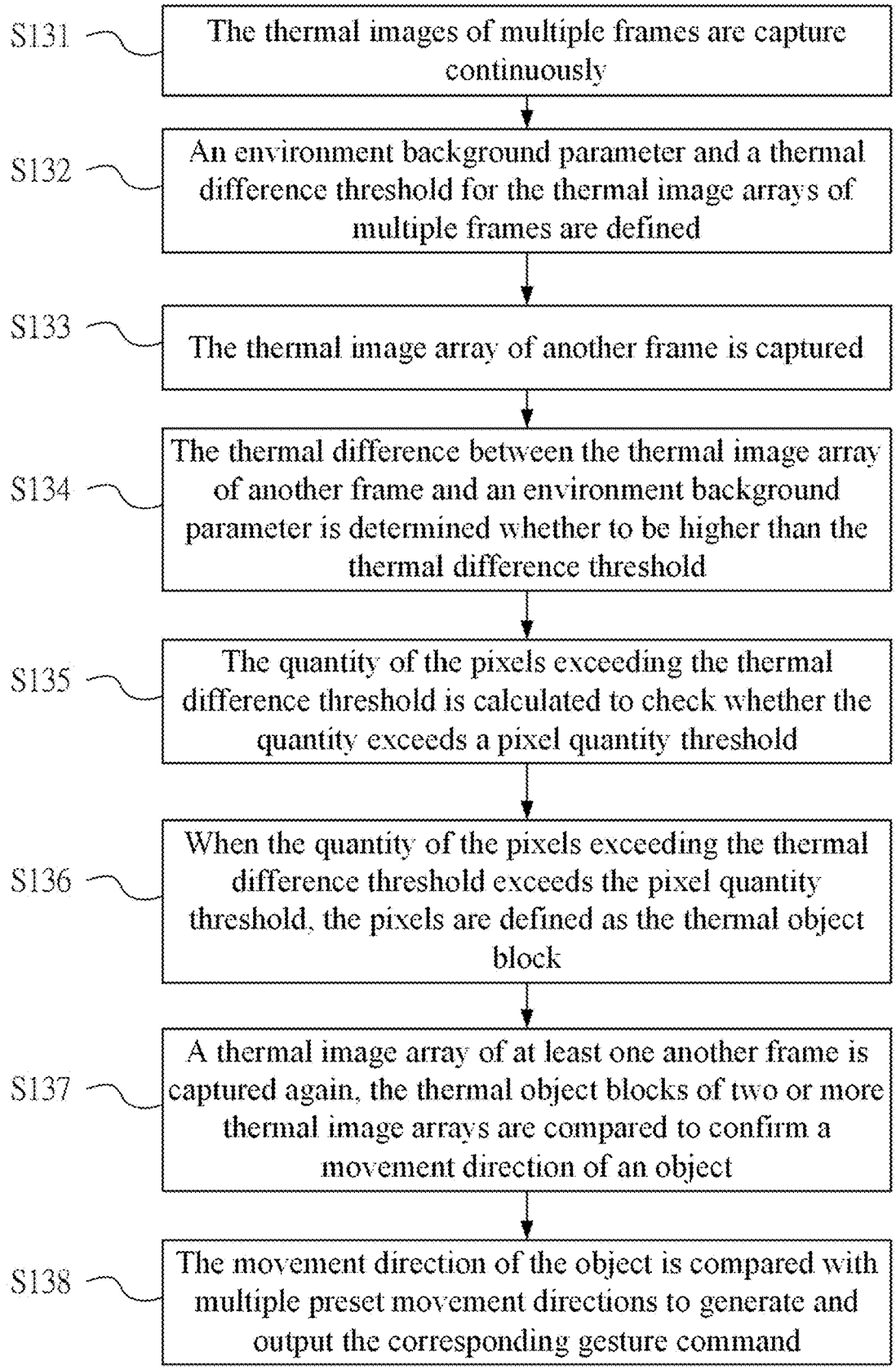
FIGS. 3A and 3B are flowcharts of two embodiments of a thermal-image proximity gesture recognition method, according to the disclosure, respectively.
Figure 3B:
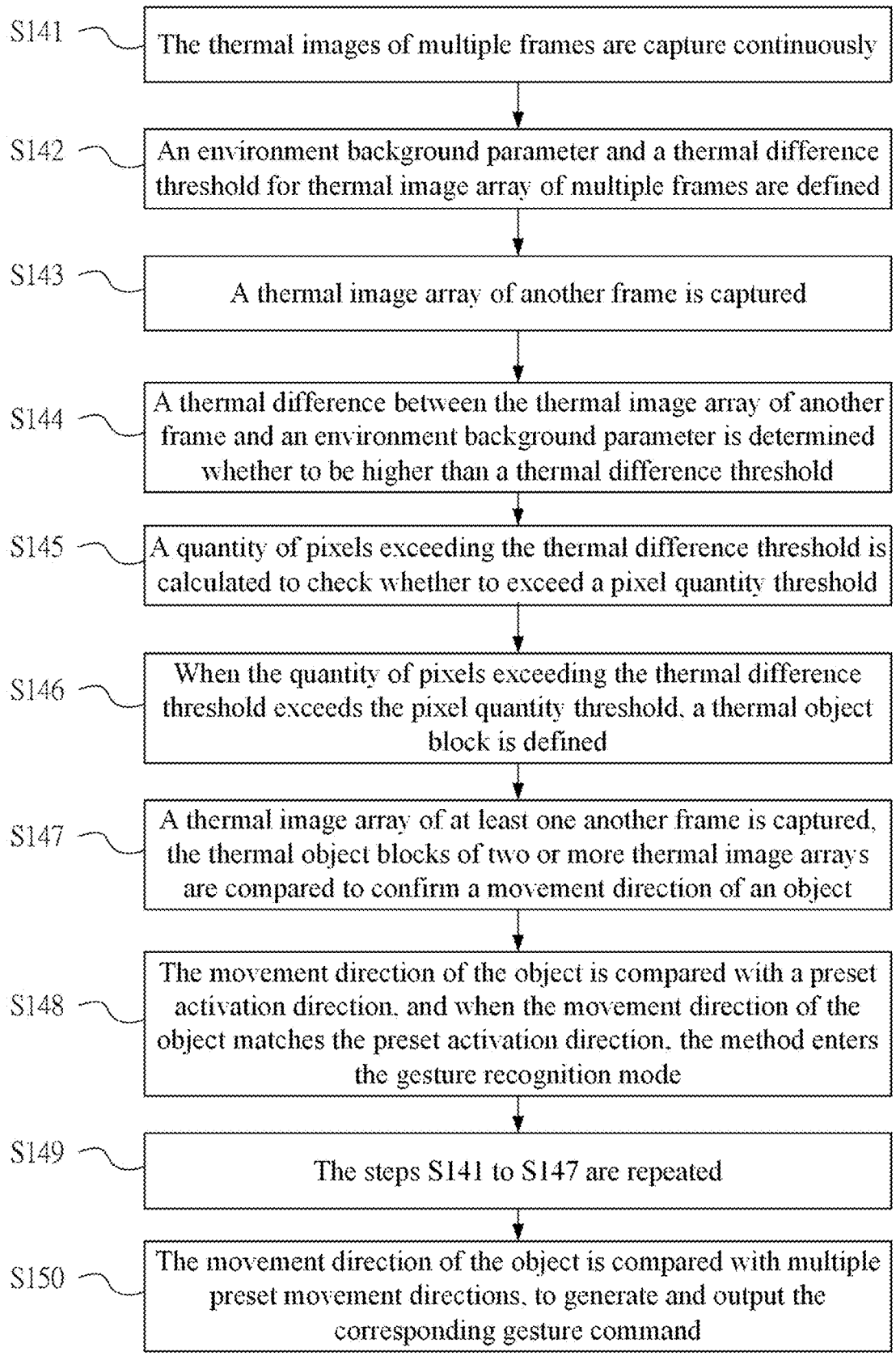

Please refer to FIGS. 3A and 3B, which are flowcharts of two embodiments of the thermal difference determination method, according to the disclosure.

The embodiment of FIG. 3A includes the following steps.

In a step S131, the thermal images of multiple frames are capture continuously, similar to the step S101.

In a step S132, an environment background parameter and a thermal difference threshold for the thermal image arrays of multiple frames are defined. In this step, the first microcontroller 11 controls the analog-to-digital converter 13 and the thermal sensor array 12 of the thermal-image proximity gesture recognition module 10 to detect. When the object 9 does not approach the detectable distance of 5~35 cm, what is detected by the thermal sensor array 12 is the environment background parameter. Because each environmental background parameter may be different, for example, the sensed value of the environmental background parameter under heat wave environment (extremely high temperature environment with, for example, 45° C. or 50° C.) is much higher than the environmental background parameter under snow environment (extremely low temperature environment with, for example, −15° C.), or a so-called normal temperature environment (25° C.). However, even if the ambient temperature is relatively high, since there is no lens to focus light on the thermal sensor array 12, the ambient background parameter detected by the thermal sensor array 12 is diffuse infrared of the environment and not necessarily equal to the ambient temperature, so the detected result is only the background value. In the embodiment, the disclosure does not necessarily perform the temperature calibration to determine the relative temperature value before delivery; rather, the sensed value captured by the thermal sensor array 12 in the current environment is directly used as the environmental background parameter. The temperature of the object 9 is generally between 25° C. and 35° C., so the thermal difference threshold between the hand temperature and the environmental background parameters can be defined in advance, this thermal difference threshold can be changed for different environment. For example, the thermal difference threshold under heat wave environment is negative, and the thermal difference threshold can be set as a higher value for a lower ambient temperature.

In a step S133, the thermal image array of another frame is captured.

In a step S134, the thermal difference between the thermal image array of another frame and an environment background parameter is determined whether to be higher than the thermal difference threshold. When the object 9 approaches the detectable distance of 5~35 cm, the heat radiation generated by the object 9 is different from the environment background parameter, so the sensed value of the thermal object block corresponding to the object 9 detected by the thermal sensor array 12 is different, and the difference between different value and the environment background parameter is defined as the thermal difference value in the disclosure. When the thermal difference value is greater than the thermal difference threshold, it supposes that the object 9 is within a detectable range of 5~35 cm.

In a step S135, the quantity of the pixels exceeding the thermal difference threshold is calculated to check whether the quantity exceeds a pixel quantity threshold. In some applications, for example, the device 100 having a thermal-image proximity gesture recognition function can be a mobile device moving to environment where a very high temperature source (such as gas burner or welding torch) appears in the distance, and the thermal difference values of pixels of the thermal object block greater than the thermal difference threshold occur but only a few pixels of the thermal sensor array 12 has the change. In this case, the thermal object block is not determined to be within the detectable range of 5~35 cm. Therefore, in this embodiment, a second threshold value is added to determine whether an object 9 similar to a hand enters the detectable range of 5~35 cm, that is, the quantity of pixels is calculated to determine whether to exceed the pixel quantity threshold. The second threshold can be set to $1/10$, $1/8$, $1/5$, $1/4$, $1/3$, or $1/2$ of a total pixel quantity. For example, the total pixel quantity of an 8×8 thermal sensor array 12 is 64, and the total pixel quantity of a 16×16 thermal sensor array 12 is 256, and the pixel quantity threshold can be easily calculated based on the total pixel quantity. When the quantity of pixels exceeding the thermal difference threshold exceeds the pixel quantity threshold, this embodiment can determine that the object is a hand.

In a step S136, when the quantity of the pixels exceeding the thermal difference threshold exceeds the pixel quantity threshold, the pixels are defined as the thermal object block. There is a minor premise that these quantities are calculated based on certain thermal object blocks. When five or six thermal object blocks appears in a 16×16 array and the quantity of the total pixels of the thermal object blocks exceeds the pixel quantity threshold, the thermal object blocks will still be determined as environmental noise. Therefore, this step is to define what the thermal object block is.

In a step S137, a thermal image array of at least one another frame is captured again, and the thermal object blocks of two or more thermal image arrays are compared to confirm a movement direction of an object. The thermal image array of at least one frame is captured again, the movement directions of the thermal object block of adjacent frames are compared to confirm the movement direction of the object.

In this step S137, the concept of capturing the thermal image array of at least one another frame is to use the thermal image arrays of at least two frames to determine the movement direction of the thermal object block matching two thresholds, to determine the gesture. Furthermore, the sensing times, sensitivities, sensed values and reset durations of the thermal sensor arrays 12 in different processes may be different, and it causes different sampling rates, that is, different frame rates. Different thermal sensor array 12 may have frame rate of 100 frame/sec, 75 frame/sec, 50 frame/sec, 30 frame/sec, or 10 frame/sec. With the differences, the movement of the object can be determined based on the movement direction of the thermal object block in 2~5 frames. The process time of thermal image capture, gesture recognition and gesture command output can achieve real time gesture output.

In a step S138, the movement direction of the object is compared with multiple preset movement directions to generate and output the corresponding gesture command. After the movement direction of the object is determined, and the gesture command corresponding to the determined movement direction is searched from the above-mentioned gesture command set, to correspondingly output the gesture command.

Similarly, in this step, the quantity of the gesture commands required for different applications are different, so it is not necessary to correspond all gestures to all gesture commands; rather, only gesture used in the application triggers the output of the gesture command.

The embodiment of FIG. 3B includes the following steps.

In a step S141, the thermal images of multiple frames are capture continuously, similar to the step S131.

In a step S142, an environment background parameter and a thermal difference threshold for thermal image array of multiple frames are defined, similar to the step S132.

In a step S143, a thermal image array of another frame is captured, similar to the step S133.

In a step S144, a thermal difference between the thermal image array of another frame and an environment background parameter is determined whether to be higher than a thermal difference threshold, similar to the step S134.

In a step S145, a quantity of pixels exceeding the thermal difference threshold is calculated to check whether to exceed a pixel quantity threshold, similar to the step S135.

In a step S146, when the quantity of pixels exceeding the thermal difference threshold exceeds the pixel quantity threshold, a thermal object block is defined, similar to the step S136.

In a step S147, a thermal image array of at least one another frame is captured, the thermal object blocks of two or more thermal image arrays are compared to confirm a movement direction of an object, similar to the step S137.

In a step S148, the movement direction of the object is compared with a preset activation direction, and when the movement direction of the object matches the preset activation direction, the method enters the gesture recognition mode. This step is the main difference between FIG. 3B and FIG. 3A; with this step, certain on-purpose operation can be used for activation, to confirm that the sequential operations are on-purpose gestures and not generated by other approaching object. The step S148 is able to prevent misuse of gesture.

In a step S149, the steps S141 to S147 are repeated. Since the hand with the on-purpose start gesture is determined, the sequential gesture recognition process can be performed.

In a step S150, the movement direction of the object is compared with multiple preset movement directions, to generate and output the corresponding gesture command, similar to the step S138.

According to above description, the thermal sensor array 12 used in the disclosure is in cooperation with the non-lens infrared window 50 of the device 100 having a thermal-image proximity gesture recognition function, so that the thermal sensor array 12 can detect the thermal image of the hand-size object within the range of 5~35 cm only, and the thermal-image proximity gesture recognition module 10 does not need to determine its distance from the object, and this solution is different from other active proximity gesture techniques.

In addition, the thermal sensor array 12 can only detect the object that generates thermal radiation, it is easy to identify and determine other object that is not a part of the human body. Therefore, when the user takes a fake hand close to the thermal sensor array 12 and wave the fake hand, the thermal-image proximity gesture recognition module 10 does not determine that the sensed object is a hand, and also does not output the gesture command. Therefore, the thermal-image proximity gesture recognition module 10 of the disclosure can be used to develop the device 100 having a thermal-image proximity gesture recognition function, to achieve special technical effects of a simple structure without lens, less misjudgment, accurate gesture recognition, more power saving, and lower cost.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A thermal-image proximity gesture recognition module, disposed on a device having a non-lens infrared window, the thermal-image proximity gesture recognition module comprising:

a thermal sensor array, formed by at least 64 thermal sensor units arranged in 8 rows and 8 columns, wherein the at least 64 thermal sensor units are configured to sense infrared irradiated from an object which is 5~35 cm distant from the non-lens infrared window, generate a thermal image array, and output a thermally induced voltage array, wherein the non-lens infrared window does not focus the infrared on the thermal sensor array, and the non-lens infrared window is in a plane shape or a curve shape;

an analog-to-digital converter, connected to the thermal sensor array, and configured to receive the thermal induced voltage array, and convert the thermally induced voltage array into a digital thermally induced voltage array; and a microcontroller, connected to the thermal sensor array and the analog-to-digital converter, wherein the microcontroller controls the thermal sensor array and the analog-to-digital converter to perform thermal image sensing and signal conversion for the object, captures thermal images of the thermal sensor array at a rate of one frame per cycle and receives the digital thermally induced voltage arrays corresponding to the frames of the thermal images in a detection sequence, and determines whether each of the digital thermally induced voltage arrays includes a thermal object block matching a hand feature, wherein when the thermal object block matching the hand feature is determined, the microcontroller generates a gesture command based on a change of the thermal object block in at least continuous two of the frames, and transmits the gesture command to a main microcontroller.

2. The thermal-image proximity gesture recognition module according to claim 1, wherein the thermal object block is determined to match the hand feature when the thermal object block matches a hand temperature range, or when the thermal object block matching a thermal difference threshold is detected and a range of the thermal object block is greater than a pixel quantity threshold.

3. The thermal-image proximity gesture recognition module according to claim 2, wherein after a system is activated and when the microcontroller detects a start gesture generated correspondingly to the object matching the hand feature, the microcontroller starts to perform a gesture recognition to output the gesture command.

4. The thermal-image proximity gesture recognition module according to claim 3, wherein the start gesture is a holding gesture, a quick wave gesture, a move left gesture, a move right gesture, a move up gesture, a move down gesture, or a rotation gesture.

5. A thermal-image proximity gesture recognition method, applied to use a thermal-image proximity gesture recognition module to detect a motion of an object and output a gesture command, wherein the thermal-image proximity gesture recognition module is disposed on a device having a non-lens infrared window, the thermal-image proximity gesture recognition module comprises a thermal sensor array, wherein the non-lens infrared window does not focus the infrared on the thermal sensor array, and the non-lens infrared window is in a plane shape or a curve shape, and the thermal-image proximity gesture recognition method comprises:

capturing thermal images of a thermal image array at a rate of one frame per cycle, and obtaining digital thermally induced voltage arrays corresponding to the frames of the thermal images in a detection sequence;

determining whether each of the digital thermally induced voltage arrays has a thermal object block matching a hand feature; and when the digital thermally induced voltage array has a thermal object block matching a hand feature, generating a gesture command based on a change of the thermal object block in at least continuous two of the frames, and transmitting the gesture command to a main microcontroller of the device.

6. The thermal-image proximity gesture recognition method according to claim 5, wherein the thermal object block is determined to match the hand feature when the thermal object block matches a hand temperature range, or when the thermal object block matching a thermal difference threshold is detected and a size of the thermal object block is greater than a pixel quantity threshold.

7. The thermal-image proximity gesture recognition method according to claim 6, further comprising:

after a system is activated and when the microcontroller detects a start gesture generated correspondingly to the object matching the hand feature, starting to perform a gesture recognition to output the gesture command, by the microcontroller.

8. The thermal-image proximity gesture recognition method according to claim 7, wherein the start gesture is a holding gesture, a quick wave gesture, a move left gesture, a move right gesture, a move up gesture, a move down gesture, or a rotation gesture.

9. A device having a thermal-image proximity gesture recognition function, comprising:

an outer shell;

a non-lens infrared window, disposed on the outer shell;

a main microcontroller; and a thermal-image proximity gesture recognition module, comprising:

a thermal sensor array, facing the non-lens infrared window and formed by at least 64 thermal sensor units arranged in 8 rows and 8 columns, wherein the at least 64 thermal sensor units are configured to sense infrared irradiated from an object which is 5~35 cm distant from the non-lens infrared window, and generate a thermal image array and output a thermally induced voltage array, wherein the non-lens infrared window does not focus the infrared on the thermal sensor array, and the non-lens infrared window is in a plane shape or a curve shape;

an analog-to-digital converter, connected to the thermal sensor array, and configured to receive the thermally induced voltage array and convert the thermally induced voltage array into a digital thermally induced voltage array; and a microcontroller, connected to the thermal sensor array and the analog-to-digital converter, wherein the microcontroller controls the thermal sensor array and the analog-to-digital converter to perform thermal image sensing and signal conversion for the object, captures thermal images of the thermal sensor array at a rate of one frame per cycle and receives the digital thermally induced voltage arrays corresponding to the frames of the thermal images in a detection sequence, and determines whether each of the digital thermally induced voltage arrays includes a thermal object block matching a hand feature presents, wherein when the thermal object block matching the hand feature is determined, the microcontroller generates a gesture command based on a change of the thermal object block in at least continuous two of the frames and transmits the gesture command to the main microcontroller.

10. The device having a thermal-image proximity gesture recognition function according to claim 9, wherein the thermal object block is determined to match the hand feature when the thermal object block matches a hand temperature range, or when the thermal object block matching a thermal difference threshold is detected and a size of the thermal object block is greater than a pixel quantity threshold.

11. The device having a thermal-image proximity gesture recognition function according to claim 10, wherein after a system is activated and when the microcontroller detects a start gesture generated correspondingly to the object matching the hand temperature range, the microcontroller starts to perform a gesture recognition to output the gesture command.

12. The device having a thermal-image proximity gesture recognition function according to claim 11, wherein the start gesture is a holding gesture, a quick wave gesture, a move left gesture, a move right gesture, a move up gesture, a move down gesture, or a rotation gesture.

* * * * *